US012801781B2

(12) United States Patent
Wang et al.

(10) Patent No.: US 12,801,781 B2
(45) Date of Patent: Nov. 17, 2026

(54) PRIVACY-PRESERVING PREDICTIVE MODELING SYSTEM AND METHOD

(71) Applicant: Dell Products L.P., Round Rock, TX (US)

(72) Inventors: Zijia Wang, London (GB); Mustafa AlBado, Cork (IE); Aidan O Mahony, Cork (IE)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/982,341

(22) Filed: Dec. 16, 2024

(65) Prior Publication Data

US 2026/0170166 A1 Jun. 18, 2026

(51) Int. Cl.
*G06F 21/62* (2013.01)
*G06N 20/20* (2019.01)

(52) U.S. Cl.
CPC ......... *G06F 21/6245* (2013.01); *G06N 20/20* (2019.01)

(58) Field of Classification Search
CPC ............................ G06F 21/6245; G06N 20/20
See application file for complete search history.

(56) References Cited

U.S. PATENT DOCUMENTS

| | | | | |
|---|---|---|---|---|
| 2020/0320221 | A1* | 10/2020 | Altug | G06F 21/6254 |
| 2020/0320548 | A1* | 10/2020 | Fusillo | G06F 18/24137 |
| 2021/0256367 | A1* | 8/2021 | Mor | G06F 16/9535 |
| 2022/0215104 | A1* | 7/2022 | Mireshghallah | G06F 18/15 |
| 2022/0222539 | A1* | 7/2022 | Klein | G06N 3/0475 |
| 2023/0205915 | A1* | 6/2023 | Wang | G06F 21/6245 726/26 |
| 2025/0124274 | A1* | 4/2025 | Pierquin | G06N 3/0475 |
| 2025/0322264 | A1* | 10/2025 | Pu | G06N 3/084 |

* cited by examiner

*Primary Examiner* — Mohamed A. Wasel
(74) *Attorney, Agent, or Firm* — Fogarty LLP

(57) ABSTRACT

According to one illustrative, non-limiting embodiment, an Information Handling System (IHS) may include computer-executable instructions to train a first model that uses only base features of a base dataset for users who do not share optional data, train a second model that uses both base and optional features of the base dataset for users who do share their optional data, implement a custom loss function to prevent a unified model from gaining an unfair advantage from the absence of optional data, and combine the first model the second model with the custom loss function to form the unified model.

17 Claims, 3 Drawing Sheets

PRIVACY-PRESERVING PREDICTIVE MODELING SYSTEM AND METHOD

BACKGROUND

Machine learning systems analyze data and establish models to make predictions and decisions. Examples of machine learning tasks include classification, regression and clustering. A predictive engine is a machine learning system that typically includes a data processing framework and one or more algorithms trained and configured based on collections of data. Such predictive engines are deployed to serve prediction results upon request. A simple example is a recommendation engine for suggesting a certain number of products to a customer based on pricing, product availabilities, product similarities, current sales strategy, and other factors. Such recommendations can also be personalized by taking into account user purchase history, browsing history, geographical location, or other user preferences or settings. Some existing tools used for building machine learning systems include Apache Spark Mllib, Apache Mahout, and Scikit-Learn.

Machine learning algorithms may be classified by how they are trained. For example, supervised learning, unsupervised learning, semi-supervised learning, and reinforcement learning include several examples of various training techniques. Training data is used for training the machine learning algorithm. A machine learning model is a result of what is learned from training with the training data, and contains a parameter set for the machine learning algorithm. Neural networks may be used in machine learning. Neural networks may be used in the supervised learning and reinforcement learning space. The effectiveness of a machine learning algorithm is influenced by its accuracy, execution time, storage requirements, and quality of the training data. The expertise and expense required for compiling a representative training set and labeling the data results in the training data and model obtained from the training data are valuable assets.

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, validation set, and/or test set can respectively include pairs of input datasets and expected output datasets that correspond to the respective input datasets.

SUMMARY

Embodiments of the present disclosure provide a privacy-preserving predictive modeling system and method that may be used to ensure privacy and user consent in predictive models used in data security and network security applications. According to one illustrative, non-limiting embodiment, an IHS may include computer-executable instructions to train a first model that uses only base features of a base dataset for users who do not share optional data, train a second model that uses both base and optional features of the base dataset for users who do share their optional data, implement a custom loss function that ensures a unified model does not gain an unfair advantage from the absence of optional data, and combine the first model the second model with the custom loss function to form the unified model.

According to another embodiment, a privacy-preserving predictive Modeling method includes the steps of training a first model that uses only base features of a base dataset for users who do not share optional data, training a second model that uses both base and optional features of the base dataset for users who do share their optional data, implementing a custom loss function that ensures a unified model does not gain an unfair advantage from the absence of optional data, and combining the first model the second model with the custom loss function to form the unified model.

According to yet another embodiment, a non-transitory memory storage device has program instructions stored thereon that, upon execution by one or more processors of an Information Handling System (IHS), cause the IHS to train a first model that uses only base features of a base dataset for users who do not share optional data, train a second model that uses both base and optional features of the base dataset for users who do share their optional data, implement a custom loss function that ensures a unified model does not gain an unfair advantage from the absence of optional data, and combine the first model the second model with the custom loss function to form the unified model.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
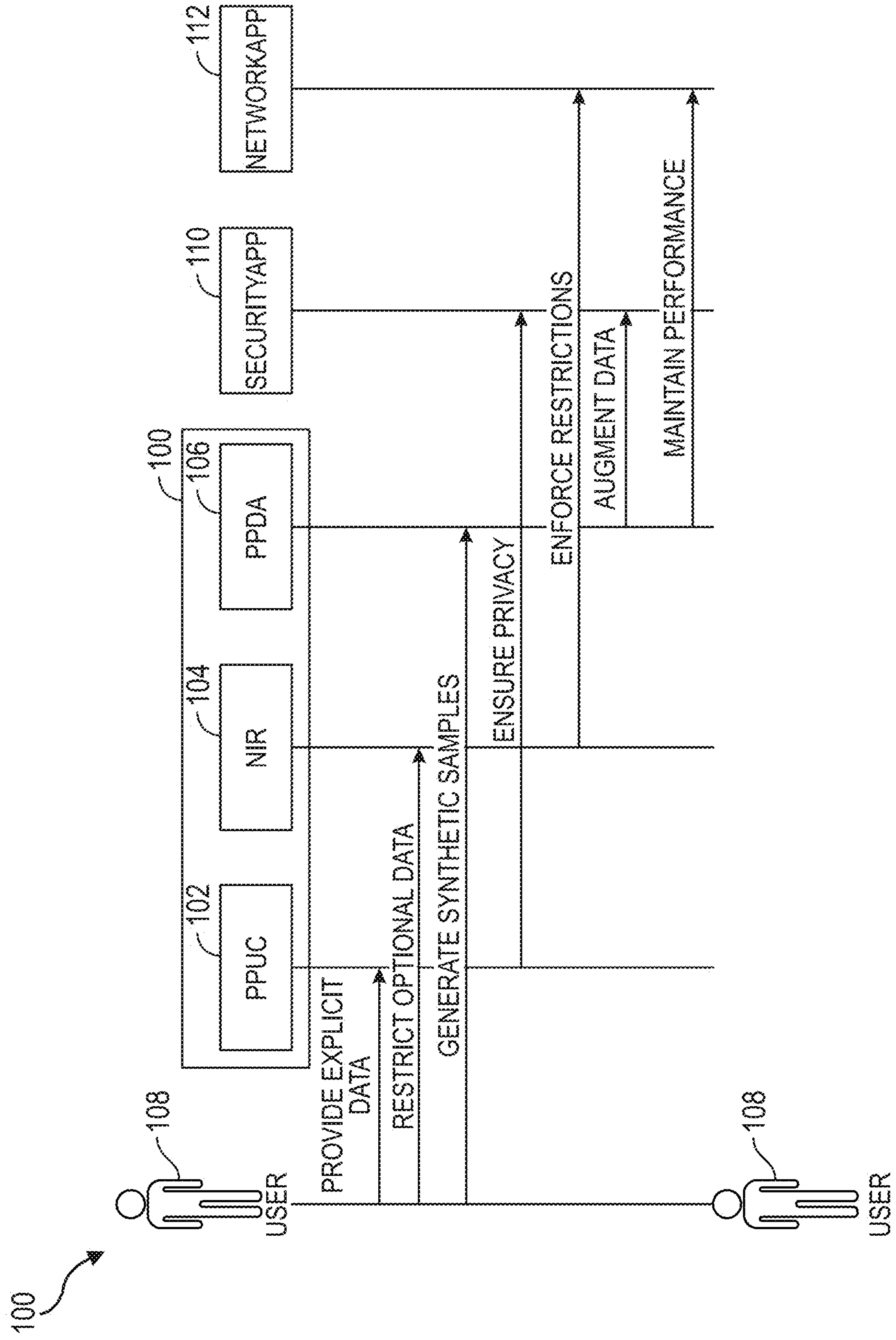
FIG. 1 illustrates an example privacy-preserving predictive modeling system that may be used to ensure privacy and user consent in predictive models used in data security and network security applications according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Today's users now interact with IHSs on a daily basis. Each of these interactions, whether accidental or intended, poses some degree of security risk, depending on the behavior of the user and/or the actions of other potential malicious entities. As such, IHS users have become aware of the need for privacy. To respond to this need, privacy standards, such as those conforming to the General Data Protection Regulation (GDPR) for members of the European Union (EU), and the California Consumer Privacy Act (CCPA) were created.

The GDPR, as well as other legislative bodies across the globe, have codified a user's 'Right to be Forgotten' aspect of privacy. According to the 'Right to forget' aspect of privacy, personal data must be erased immediately where the data is no longer needed for its original processing purpose, or the data subject has withdrawn his/her consent (e.g., deleting a user's account, unsubscribing the user, etc.). Organizations are complying with 'right to forget' by creating policies and tools for customers to, for example, delete their own data, create data classifications and set expiration dates according to a classification of data, and disable processing of personal data by third parties.

Conventional activities within the industry have been focused on 'data deletion'. Many artificial intelligence (AI) models (Machine Learning (ML), Deep Learning, Heuristics, etc.) are typically trained using relatively large datasets. Although these models may not remember individual users after training is complete, the model outcomes and learning are, in many cases, shaped by the user's data, including user features derived from the data.

In the era of big data, ensuring user privacy and consent in predictive modeling has become increasingly critical. Traditional methods often inadvertently infer information from the absence of optional data, compromising user privacy and consent. There is a pressing need for solutions that respect user preferences while maintaining optimal predictive performance. In recent years, moreover, the importance of privacy-preserving techniques in predictive modeling has gained significant attention. Various techniques have been proposed to address the challenges of user privacy and consent in data-driven applications.

In predictive modeling, ensuring user privacy and consent while maintaining optimal performance poses several significant challenges. Traditional methods often fall short in addressing these issues comprehensively. The primary challenges may include implicit inferences made by predictive models from the absence of optional data. When users choose not to provide certain information, traditional models may still infer details based on this lack of information (e.g., missingness), thus violating user privacy and consent. Another challenge may include maintaining the predictive performance of models when optional data is not available. Traditional privacy-preserving techniques often degrade the performance of models, thus leading to suboptimal outcomes for users who do not share additional data.

Yet another challenge may include fairness for non-sharers. Ensuring fairness for users who opt not to share optional data is a critical concern. Models should not penalize non-sharers or provide them with inferior predictive results. Achieving this fairness while respecting user privacy and maintaining performance can be a complex task.

FIG. 1 illustrates an example privacy-preserving predictive Modeling system 100 that may be used to ensure privacy and user consent in predictive models used in data security and network security applications according to one embodiment of the present disclosure. The privacy-preserving predictive Modeling system 100 comprises three primary components: a Privacy-Preserving User Consent (PPUC) component 102, a Non-Inference Restriction (NIR) component 104, and a Privacy-Preserving Data Augmentation (PPDA) component 106.

In general, the PPUC component 102 ensures that predictive models only utilize data explicitly provided by users, avoiding any implicit inferences from the absence of optional data, the NIR component 104 enforces that models do not infer information from the unavailability of such optional features, relying solely on base features for predictions, while the PPDA component 106 is a model-agnostic data augmentation technique designed to generate synthetic samples, preventing models from learning from patterns of missing data and ensuring that the distribution of labels given the missingness is equivalent to the overall label distribution.

The privacy-preserving predictive Modeling system 100 may enhance data security and network security applications, ensuring fairness and protection for users who choose not to share optional data. Embodiments of the present disclosure may provide certain benefits, such as reducing the risk of data breaches and unauthorized data usage, enhancing the trustworthiness of a company's security solutions by strictly adhering to user consent and privacy preferences, and/or maintaining high-performance standards in predictive modeling, ensuring that non-sharers do not face significant disadvantages compared to sharers. Additionally, tests have shown on real-world and synthetic datasets that PPDA models can potentially achieve near-optimal performance while maintaining some, most, or all user privacy preferences.

Users 108 may interact with the privacy-preserving predictive Modeling system 100 by providing explicit data to the Privacy-Preserving User Consent (PPUC) component 102, restricting optional data through the Non-Inference Restriction (NIR) component 104, and generating synthetic samples via the Privacy-Preserving Data Augmentation (PPDA) component 106. The PPUC component 102 ensures that only explicitly provided data is used, such as enhancing user privacy in Security Applications (SecApps) 110. Conventional consent management systems focus on obtaining and managing user consent for data collection and processing. However, those conventional systems often do not address the issue of implicit inferences made from the absence of optional data.

The NIR component 104 prevents or reduces inferences from missing data, such as enforcing restrictions in Network Applications (NetApp) 112. Moreover, the NIR component 104 may prevent or reduce models from inferring information from the unavailability of optional features. Conventional approaches, such as differential privacy, can provide a mathematical framework to ensure that the removal or addition of a single data point does not significantly affect the outcome of the analysis. However, these conventional approaches often do not specifically address the issue of inference from missing data.

The PPDA component 106 generates synthetic samples, augmenting data for SecApps 110 and maintaining performance for network applications (NetApps) 112, thereby achieving a balance between user privacy and optimal predictive performance. The PPDA component 106 generates synthetic samples to prevent models from learning from patterns of missing data. Conventional approaches have focused on privacy-preserving data aggregation in wireless sensor networks. While they may be effective in specific domains, they do not provide a comprehensive solution for maintaining label distribution equivalence in predictive modeling.

Information produced by the PPUC component 102, NIR component 104, and PPDA component 106 can be combined to address the limitations of previous methods. Such an approach ensures that predictive models respect user preferences, avoid implicit inferences from missing data, and maintain optimal predictive performance.

Current data augmentation techniques do not adequately address the issue of maintaining label distribution equivalence in the presence of missing data. There is a need for a comprehensive data augmentation method that reduces or prevents models from learning from patterns of missing data and ensures fair and accurate predictions. Embodiments of the present disclosure provide a privacy-preserving predictive Modeling system and method that integrates Privacy-Preserving User Consent (PPUC), Non-Inference Restriction (NIR), and Privacy-Preserving Data Augmentation (PPDA) to overcome these challenges. The privacy-preserving predictive Modeling system and method ensures that predictive models respect user preferences, avoid implicit inferences from missing data, and maintain optimal predictive performance.

The PPUC component 102 ensures that predictive models utilize only the data explicitly provided by users, avoiding implicit inferences from the absence of optional data. The PPUC component 102 can be important for maintaining user privacy and adhering to consent requirements. Let X be the space of base features, and Z be the space of optional features. A user's data instance may be represented as (x, a, z*), where $x \in X$, $z^* \in Z \cup \{N/A\}$, and $a \in \{0, 1\}$ indicates the availability of the optional feature. The goal is to predict a label y based on the provided data. The PPUC constraint can be formalized as:

$$f(x, a, z^*) = \begin{cases} g(x) & \text{if } a = 0 \\ h(x, z^*) & \text{if } a = 1 \end{cases}$$

Where g and h are prediction functions that only use the provided data. The optimal predictor under PPUC is defined as:

$$(x, a, z^*) = \begin{cases} \mathbb{E}[Y|X = x] & \text{if } a = 0 \\ \mathbb{E}[Y|X = x, Z = z^*] & \text{if } a = 1 \end{cases}$$

Where g and h are prediction functions that only use the provided data. The optimal predictor under PPUC is defined as:

The NIR component 104 ensures that the predictive model does not infer information from the unavailability of optional features. This is achieved by constraining the model to rely solely on base features when optional features are not provided. NIR is implemented by enforcing that the model's predictions for non-sharers (e.g., those who do not provide optional features) are based only on the base features. This restriction prevents the model from learning patterns from the missingness of data. The NIR constraint may be defined as:

$$\mathbb{E}[L(g(X), Y)|A = 0] \geq \mathbb{E}[L(f^*(X), Y)|A = 0]$$

Where L is a loss function (e.g., mean squared error), and f* is the optimal base feature model.

The PPDA component 106 generates synthetic samples to prevent the model from learning patterns from missing data. This technique ensures that the distribution of labels given the missingness is equivalent to the overall label distribution, maintaining fairness and predictive performance. The PPDA component 106 creates synthetic samples by augmenting the dataset. For each instance with optional features, a corresponding instance is generated with the optional features marked as missing. This augmentation prevents the model from inferring information from the missing data patterns.

Let D be the original dataset, and D' be the augmented dataset. For each instance $(x, a, z^*, y) \in D$, a synthetic instance (x, 0, N/A, y) is added to D'. The loss function for the augmented dataset is:

$$\mathbb{E}_{((x,a,z^*,y)\sim\mathcal{D})'}[L(f(x, a, z^*), y)]$$

Figure 2:
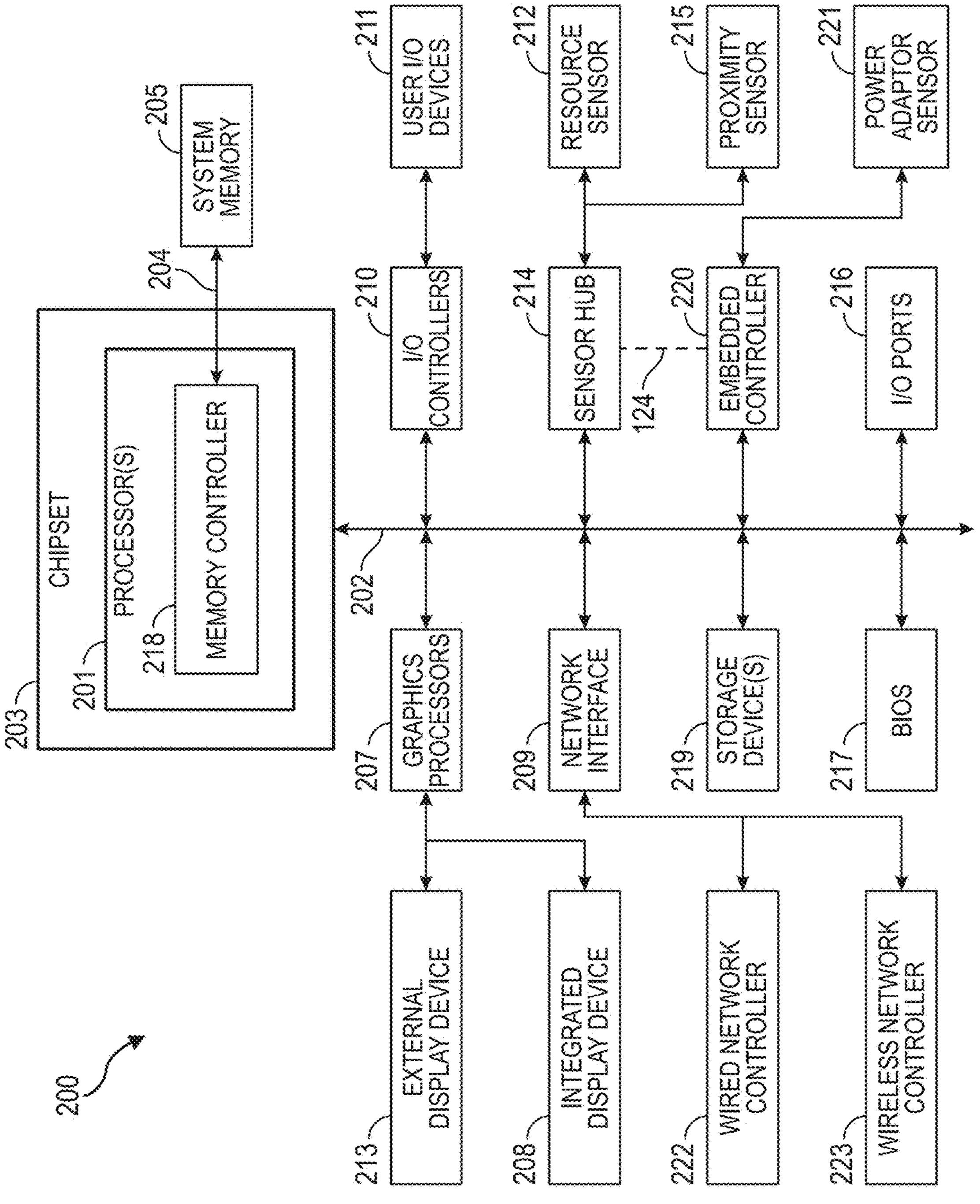
FIG. 2 is a block diagram illustrating components of an example IHS that may be configured to execute the PPUC component, NIR component, and PPDA component of the privacy-preserving predictive modeling system according to one embodiment of the present disclosure.

FIG. 2 is a block diagram illustrating components of an example IHS 200 that may be configured to execute the PPUC component 102, NIR component 104, and PPDA component 106 according to one embodiment of the present disclosure. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O 216 ports may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, IOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 100.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 124.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
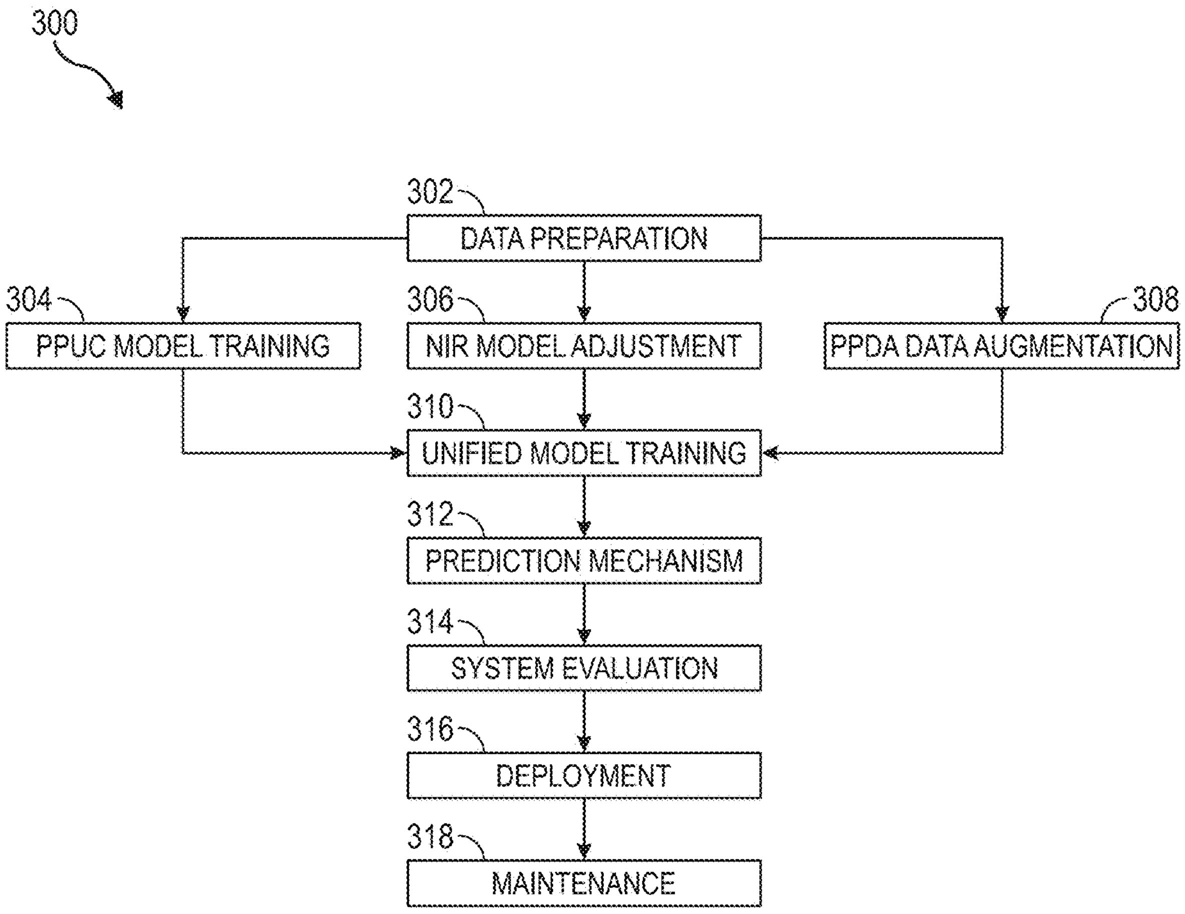
FIG. 3 illustrates an example privacy-preserving predictive modeling method that may be performed to ensure privacy and user consent in predictive models used in data security and network security applications according to one embodiment of the present disclosure.

FIG. 3 illustrates an example privacy-preserving predictive Modeling method 300 that may be performed to ensure privacy and user consent in predictive models used in data security and network security applications according to one embodiment of the present disclosure. Additionally or alternatively, certain steps of the privacy-preserving predictive Modeling method 300 may be performed by the privacy-preserving predictive Modeling system 100 described above with reference to FIG. 1.

Initially at step 302, data is prepared for use by the PPUC component 102, NIR component 104, and PPDA component 106. In one embodiment, the privacy-preserving predictive Modeling method 300 may provide feature identification by identifying which features in the dataset are base features (X) and which are optional (Z). In another embodiment, the privacy-preserving predictive Modeling method 300 may provide feature identification by creating a binary indicator (A) for each instance indicating the availability of optional features.

In yet another embodiment, the privacy-preserving predictive Modeling method 300 prepare the data by segmenting it into two subsets: one for users who share optional data (A=1), and one for users who do not share the optional data (A=0).

At step 304, the privacy-preserving predictive Modeling method 300, using the PPUC component 102, trains two models: one that uses only base features for users who do not share optional data and another that uses both base and optional features for users who do share their optional data.

The privacy-preserving predictive Modeling method 300, using the NIR component 104, implements a custom loss function that ensures the model does not gain an unfair advantage from the absence of optional data at step 306. The privacy-preserving predictive Modeling method 300 may also validate that the performance on non-sharers does not exceed the performance of a base model trained only on available features.

The privacy-preserving predictive Modeling method 300, using the PPDA component 106, augments the data by creating synthetic instances where optional data is set to missing, even for users who originally shared their data to balance the label distribution across different patterns of data availability at step 308.

At step 310, the privacy-preserving predictive Modeling method 300 combines the datasets from the PPUC component 102 and NIR component 104 to form a unified dataset. The privacy-preserving predictive Modeling method 300 may also train a comprehensive model using the augmented dataset obtained from the PPDA component 106 to ensure it adheres to the constraints set by the PPUC component 102 and NIR component 104. At step 312, the privacy-preserving predictive Modeling method 300 deploys the comprehensive model for predicting new instances.

That is, the privacy-preserving predictive Modeling method 300 may infer future data points based upon the comprehensive model generated at step 310. The privacy-preserving predictive Modeling method 300 may also choose between the base model and the comprehensive (e.g., full-feature) model based on the availability of user data at prediction time. For new predictions, the privacy-preserving predictive Modeling method 300 may check the availability of optional data and dynamically decide which model to use (e.g., either the comprehensive model or the base model) to ensure compliance with PPUC and NIR principles as well as one or more privacy standards, such as those conforming to the GDPR and/or CCPA.

At step 314, the privacy-preserving predictive Modeling method 300 may perform system evaluation by evaluating the system's performance on both sharers and non-sharers to ensure that the introduction of privacy-preserving mechanisms do not unduly degrade model accuracy. The privacy-preserving predictive Modeling method 300 may also regularly audit the model predictions to ensure that the NIR and PPUC constraints are continuously met, especially as new data and potentially new feature types are introduced into the system. The privacy-preserving predictive Modeling method 300 may also conduct tests to ensure that the system does not exhibit bias against non-sharers or any particular demographic group, maintaining fairness across some, most, or all user interactions.

At step 316, the privacy-preserving predictive Modeling method 300 may deploy the system in a secure environment that complies with relevant data protection regulations, such as the GDPR or the CCPA. The privacy-preserving predictive Modeling method 300 may also ensure that the system interfaces cleanly with existing IT infrastructure to receive new data and update models periodically.

At step 318, the privacy-preserving predictive Modeling method 300 may perform maintenance by regularly updating the model training and prediction pipelines to accommodate changes in data patterns, feature relevance, and regulatory requirements. The privacy-preserving predictive Modeling method 300 may also continuously monitor system performance and user feedback to make iterative improvements over time.

Although FIG. 3 describes one example of a process that may be performed to ensure privacy and user consent in predictive models used in data security and network security applications, the features of the disclosed process may be embodied in other specific forms without deviating from the spirit and scope of the present disclosure. For example, the method 300 may perform additional, fewer, or different operations than those operations as described in the present example. As another example, one or more of the steps of the process described herein may be performed by a computing system other than the IHS 200, such as by a cloud-based service that is accessed from a publicly accessible network (e.g., the Internet).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
at least one processor; and
at least one memory coupled to the at least one processor, the at least one memory having program instructions stored thereon that, upon execution by the at least one processor, cause the IHS to:
train a first model that uses only base features of a base dataset for users who do not share optional data;
create a plurality of synthetic instances where the optional data is set to missing to form an augmented dataset;
train a second model that uses both base and optional features of the base dataset for users who do share their optional data;
implement a custom loss function to prevent a unified model from gaining an unfair advantage from the absence of optional data;
combine the first model and the second model with the custom loss function to form the unified model; and
combine the synthetic instances with the unified model to form a comprehensive model.

2. The IHS of claim 1, wherein the instructions further cause the IHS to, for each of the instances with optional features, generate a corresponding instance with the optional features marked as missing.

3. The IHS of claim 1, wherein the instructions further cause the IHS to audit the model predictions to ensure that one or more constraints associated with the unified model and comprehensive model are continuously met.

4. The IHS of claim 1, wherein the instructions further cause the IHS to infer one or more future data points using either of the unified model or the comprehensive model.

5. The IHS of claim 4, wherein the instructions further cause the IHS to determine which of the unified model or the comprehensive model to use based upon compliance with a privacy standard.

6. The IHS of claim 1, wherein the instructions further cause the IHS to determine which of the unified model or the comprehensive model to use based upon the availability of user data at prediction time.

7. The IHS of claim 1, wherein the instructions further cause the IHS to:
identify which features in the base dataset are base features and which are optional features; and
create a binary indicator that indicates the availability of the optional features.

8. A privacy-preserving predictive Modeling method comprising:
training a first model that uses only base features of a base dataset for users who do not share optional data;
create a plurality of synthetic instances where the optional data is set to missing to form an augmented dataset;
training a second model that uses both base and optional features of the base dataset for users who do share their optional data;
implementing a custom loss function to prevent a unified model from gaining an unfair advantage from the absence of optional data;

combining the first model and the second model with the custom loss function to form the unified model; and combining the synthetic instances with the unified model to form a comprehensive model.

9. The privacy-preserving predictive Modeling method of claim 8, further comprising, for each of the instances with optional features, generating a corresponding instance with the optional features marked as missing.

10. The privacy-preserving predictive Modeling method of claim 8, further comprising auditing the model predictions to ensure that one or more constraints associated with the unified model and comprehensive model are continuously met.

11. The privacy-preserving predictive Modeling method of claim 8, further comprising inferring one or more future data points using either of the unified model or the comprehensive model.

12. The privacy-preserving predictive Modeling method of claim 11, further comprising determining which of the unified model or the comprehensive model to use based upon compliance with a privacy standard.

13. The privacy-preserving predictive Modeling method of claim 8, further comprising determining which of the unified model or the comprehensive model to use based upon the availability of user data at prediction time.

14. The privacy-preserving predictive Modeling method of claim 8, further comprising:

identifying which features in the base dataset are base features and which are optional features; and creating a binary indicator that indicates the availability of the optional features.

15. A non-transitory memory storage device having program instructions stored thereon that, upon execution by one or more processors of an Information Handling System (IHS), cause the IHS to:

train a first model that uses only base features of a base dataset for users who do not share optional data;

create a plurality of synthetic instances where the optional data is set to missing to form an augmented dataset;

train a second model that uses both base and optional features of the base dataset for users who do share their optional data;

implement a custom loss function to prevent a unified model from gaining an unfair advantage from the absence of optional data;

combine the first model and the second model with the custom loss function to form the unified model; and combine the synthetic instances with the unified model to form a comprehensive model.

16. The non-transitory memory storage device of claim 15, wherein the instructions further cause the IHS to, for each of the instances with optional features, generate a corresponding instance with the optional features marked as missing.

17. The non-transitory memory storage device of claim 15, wherein the instructions further cause the IHS to infer one or more future data points using either of the unified model or the comprehensive model.

* * * * *